(12) United States Patent
Gilmore et al.

(10) Patent No.: US 11,850,980 B2
(45) Date of Patent: Dec. 26, 2023

(54) VEHICLE SEAT ASSEMBLY INCORPORATING QUASI-ZERO/NEGATIVE STIFFNESS VIBRATION ISOLATORS

(71) Applicant: Toyota Motor Engineering & Manufacturing North America, Inc., Plano, TX (US)

(72) Inventors: Paul A Gilmore, Ann Arbor, MI (US); Umesh N. Gandhi, Farmington Hills, MI (US); Ryohei Tsuruta, Ann Arbor, MI (US); Brian J. Pinkelman, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 428 days.

(21) Appl. No.: 17/180,056

(22) Filed: Feb. 19, 2021

(65) Prior Publication Data

US 2022/0144152 A1    May 12, 2022

Related U.S. Application Data

(60) Provisional application No. 63/110,658, filed on Nov. 6, 2020.

(51) Int. Cl.
*B60N 2/50* (2006.01)
*F16F 3/12* (2006.01)
*F16F 15/08* (2006.01)

(52) U.S. Cl.
CPC ............ *B60N 2/502* (2013.01); *F16F 3/12* (2013.01); *F16F 15/085* (2013.01); *F16F 2224/025* (2013.01); *F16F 2226/042* (2013.01); *F16F 2226/045* (2013.01); *F16F 2228/063* (2013.01); *F16F 2230/36* (2013.01); *F16F 2234/04* (2013.01)

(58) Field of Classification Search
CPC .. B60N 2/502; B60N 2/544; F16F 3/12; F16F 15/085; F16F 2234/04; F16F 2230/36; F16F 2228/063; F16F 3/026
USPC .............................. 297/216.2, 216.1, 216.16
See application file for complete search history.

(56) References Cited

U.S. PATENT DOCUMENTS

| | | | |
|---|---|---|---|
| 3,770,235 A * | 11/1973 | Klapproth | B60N 2/502 248/634 |
| 4,062,585 A * | 12/1977 | Herring, Jr. | B62J 1/02 297/195.1 |
| 4,215,841 A * | 8/1980 | Herring, Jr. | B60N 2/502 248/635 |
| 4,396,220 A | 8/1983 | Dieckmann et al. | |
| 4,779,852 A | 10/1988 | Wassell | |
| 5,533,784 A * | 7/1996 | Fukuoka | A47C 3/02 297/311 |

(Continued)

FOREIGN PATENT DOCUMENTS

| CN | 111216607 A | * | 6/2020 |
|---|---|---|---|
| JP | 5112226 A | | 3/2010 |

(Continued)

*Primary Examiner* — Milton Nelson, Jr.
(74) *Attorney, Agent, or Firm* — Christopher G. Darrow; Darrow Mustafa PC

(57) ABSTRACT

A vehicle seat assembly includes a seat frame, a seat pan, and a plurality of vibration isolators interposed between the seat frame and the seat pan for limiting transmission of vibrations from the seat frame to the seat pan.

13 Claims, 7 Drawing Sheets

(56) References Cited

U.S. PATENT DOCUMENTS

| | | |
|---|---|---|
| 5,971,432 A | 10/1999 | Gagnon et al. |
| 6,443,524 B1 | 9/2002 | Yu |
| 8,812,881 B1 | 8/2014 | Heath |
| 9,004,437 B2 | 4/2015 | Yamada et al. |
| 9,770,960 B2 | 9/2017 | Leonard et al. |
| 10,371,229 B2 | 8/2019 | Gandhi et al. |
| 10,677,310 B2 | 6/2020 | Gandhi et al. |
| 2014/0265468 A1 | 9/2014 | Greenhill et al. |
| 2019/0186589 A1 | 6/2019 | Gandhi et al. |

FOREIGN PATENT DOCUMENTS

| | | |
|---|---|---|
| JP | 2011201378 A | 10/2011 |
| JP | 5581241 A | 8/2012 |
| JP | 2018188035 A | 11/2018 |

\* cited by examiner

VEHICLE SEAT ASSEMBLY INCORPORATING QUASI-ZERO/NEGATIVE STIFFNESS VIBRATION ISOLATORS

CROSS REFERENCE TO RELATED APPLICATIONS

This application claims the benefit of U.S. Provisional Application No. 63/110,658, filed on Nov. 6, 2020, which is herein incorporated by reference in its entirety.

TECHNICAL FIELD

The present invention relates to seat and, more particularly, to a vehicle seat assembly incorporating one or more components for isolating an occupant of the seat assembly from vibrations generated by movement of a vehicle along a road surface.

BACKGROUND

It has been found that low frequency vibrations (in the range 0-10 Hz) experienced by a vehicle traveling along a road surface can be especially irritating to vehicle occupants. Forces resulting from these vibrations may be transmitted from the vehicle chassis to seats where the occupants are sitting. It can be difficult to isolate the passenger seats from these vibrations. Currently-used methods of isolating vehicle seats from such vibrations may be complex and expensive. In addition, in certain applications, vibration isolators may be subjected to side loading or torsional loading which acts to urge a portion of the isolator in a direction away from a central axis of the isolator in an unloaded condition.

SUMMARY

In one aspect of the embodiments described herein, a vehicle seat assembly is provided. The seat assembly includes a seat frame, a seat pan, and a plurality of vibration isolators interposed between the seat frame and the seat pan for limiting transmission of vibrations from the seat frame to the seat pan.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a vehicle seat assembly including a seat frame, a seat pan, and a plurality of vibration isolators interposed between the seat frame and the seat pan for limiting transmission of vibrations from the seat frame to the seat pan. Each vibration isolator may include a first conical disc spring member having a first end and a second end opposite the first end. A first-end spacer of the isolator is in contact with the first spring member first end. A second-end spacer is in contact with the first spring member second end. A second conical disc spring member of the isolator has a first end and a second end opposite the first end, the second spring member first end being in contact with the first-end spacer. Another second-end spacer of the isolator is in contact with the second spring member second end. In addition, each isolator may include a flexible housing defining an interior. The housing may be in contact with and extend between the second-end spacer and the other second-end spacer so that the first-end spacer and the first and second spring members are received in the interior. The housing may also include a plurality of spaced-apart through holes formed therealong between the second-end spacer and the other second-end spacer. Also, each vibration isolator may be structured to provide a quasi-zero/negative stiffness response to a force applied to the vibration isolator when the applied force is within a predetermined range.

Figure 1:
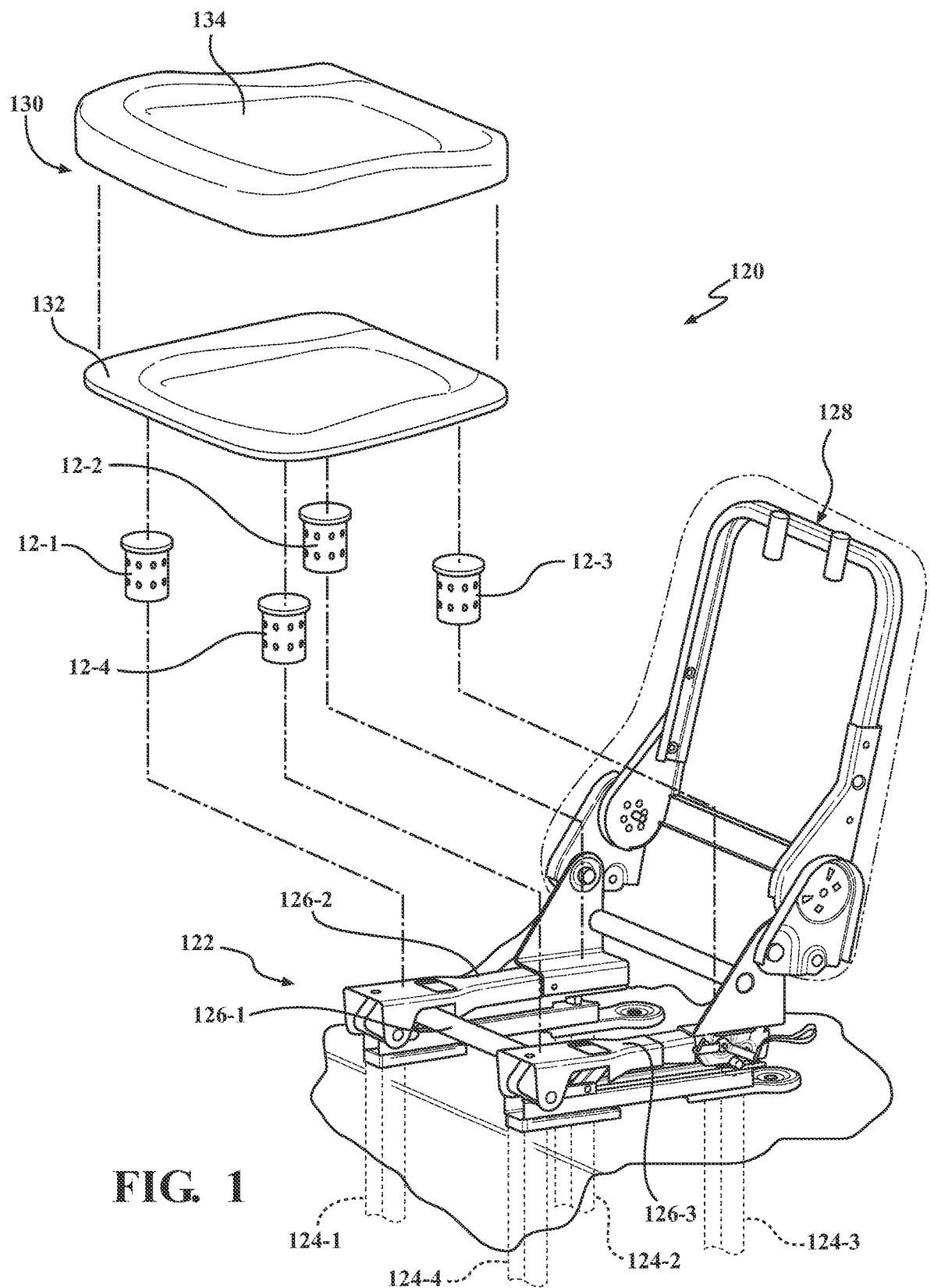
FIG. 1 is a schematic exploded perspective view of a seat assembly in accordance with an embodiment described herein.

FIG. 1 is a schematic exploded perspective view of a seat assembly 120 in accordance with an embodiment described herein. Embodiments of the seat assembly 120 discussed herein are described as being mounted in a vehicle for seating of vehicle occupants. However, a seat assembly as described herein may also be incorporated (with suitable modifications) into other applications where vibration isolation may be a concern.

Figure 2:
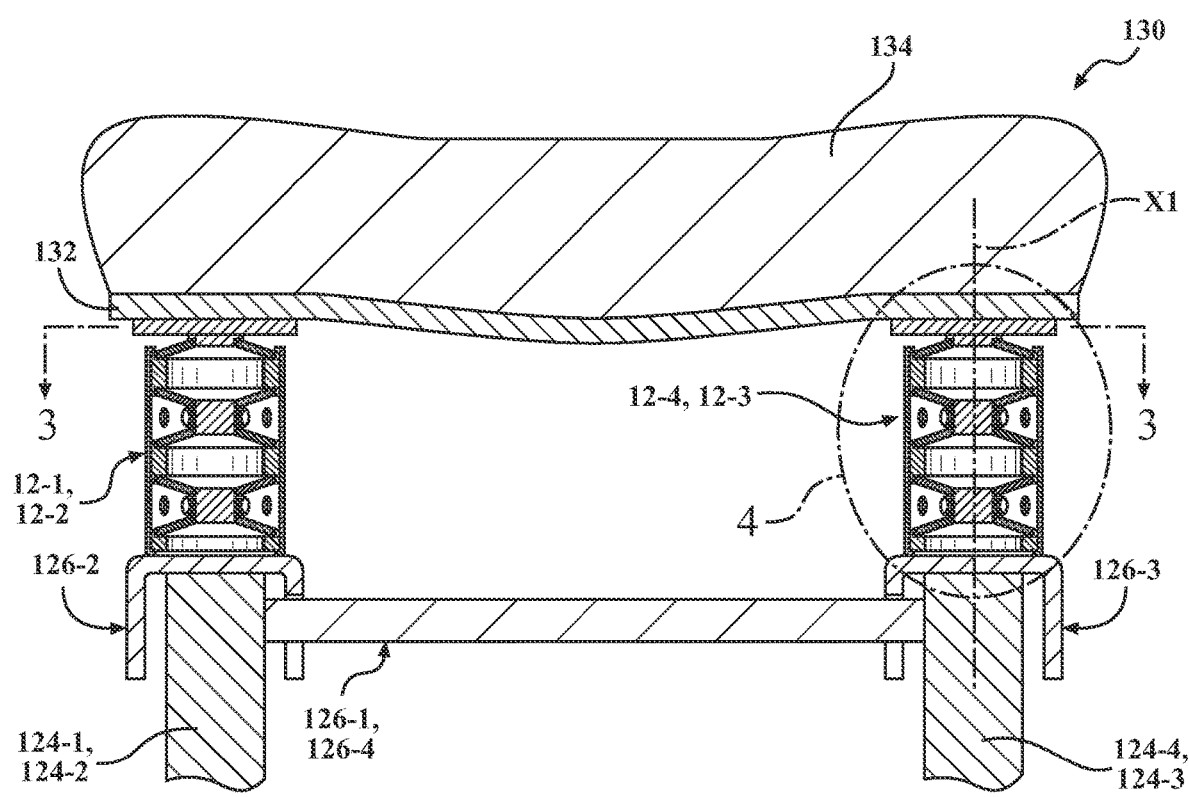
FIG. 2 is a schematic frontal cross-sectional view of a portion of the seat assembly of FIG. 1 shown in an assembled condition with a plurality of vibration isolators interposed between the seat frame and the seat pan for supporting the seat pan.

The vehicle seat assembly 120 may include a seat frame 122, a seat pan 132, and a plurality of vibration isolators 12-1 through 12-4 in accordance with an embodiment described herein, interposed between the seat frame 122 and the seat pan 132 for limiting transmission of vibrations from the seat frame to the seat pan. FIG. 2 is a schematic front view of a portion of the seat assembly 120 shown in an assembled condition with vibration isolators 12-1 through 12-4 interposed between the seat frame 122 and the seat pan 132 for supporting the seat pan. The seat assembly 120 is shown in FIG. 2 in an unloaded condition (i.e., with no occupant seated in on a seat cushion 134 supported by the seat pan 132).

The seat frame 122 is a structure providing a framework for the vehicle seat assembly 120 and which supports the seat pan 132. Thus, as seen in FIGS. 1, 2, 3, 5 and 7, the seat frame 122 supports the seat pan 132 and the isolators 12-1 through 12-4 may be interposed between the seat frame 122 and the seat pan 132 for limiting transfer of vibrations (e.g., vibrations generated by a vehicle traveling over a road surface) from the seat frame 122 to the seat pan 132. The seat frame 122 may include any structure of the seat assembly residing below the seat pan 132 and supporting the seat pan when the seat assembly 120 is mounted in the vehicle (not shown).

In one or more arrangements, the seat frame 122 may include a plurality of frame rails 124. The embodiment shown includes frame rails 124-1 through 124-4 extending generally vertically from a frame base (not shown). As shown in FIG. 1, a frame rail may extend along each of four corners of the seat frame 122. The frame base may be positioned on a floor of the vehicle occupant compartment. One or more generally horizontally-extending frame supports 126 may extend between adjacent ones of the frame rails 124 for connecting the frame rails to stiffen and strengthen the seat frame 122. The embodiment shown includes frame supports 126-1 through 126-4. An end of each frame support 126 may intersect an end of another, adjacent frame support. Alternatively, (or additionally), an end of each frame support 126 may intersect an associated one of frame rails 124.

A seat bottom 130 may be formed from the seat pan 132 and seat cushion 134 secured to the seat pan. For purposes described herein, a "seat pan" is an element which directly supports a cushion of the vehicle seat. The seat pan 132 is supported by the vibration isolators 12-1 through 12-4 and the seat frame 122, and supports the seat cushion 134.

Figure 3:
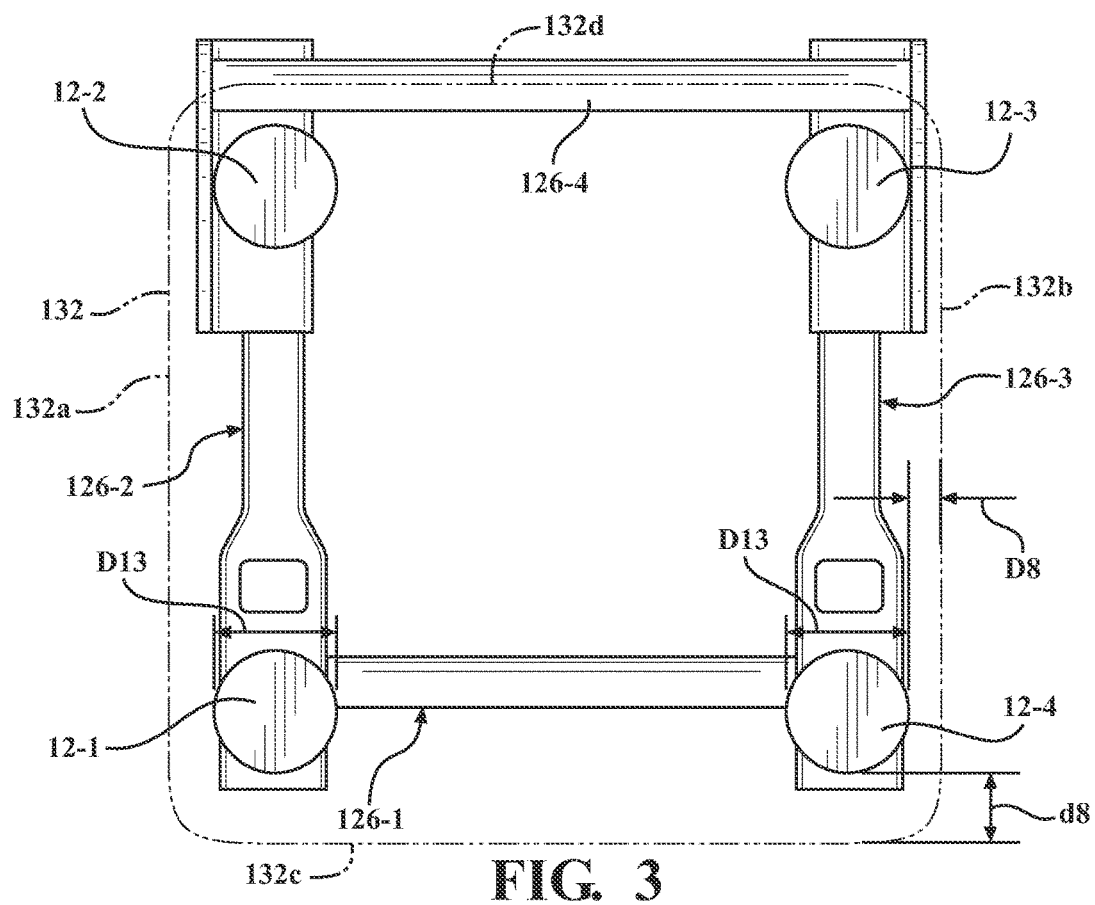
FIG. 3 is a schematic plan view of a portion of the seat assembly of FIGS. 1 and 2 showing the seat pan in phantom.

FIG. 3 is a schematic plan view of a portion of the seat assembly 120 showing the seat pan 132 in phantom residing on isolators 12-1 through 12-4. Referring to FIG. 3, in one or more arrangements, the seat pan 132 may include (from the perspective of an occupant seated in the seat) a right side edge 132a, a left side edge 132b positioned opposite the right side edge, a front edge 132c extending between the right side edge 132a and left side edge 132b, and a rear edge 132d positioned opposite the front edge 132c. Referring again to FIG. 1, a conventional seat back 128 may be rotatably or otherwise adjustably coupled to the seat bottom 130 and/or to a portion of the seat frame 122 residing below and supporting the seat bottom 130.

Figure 4:
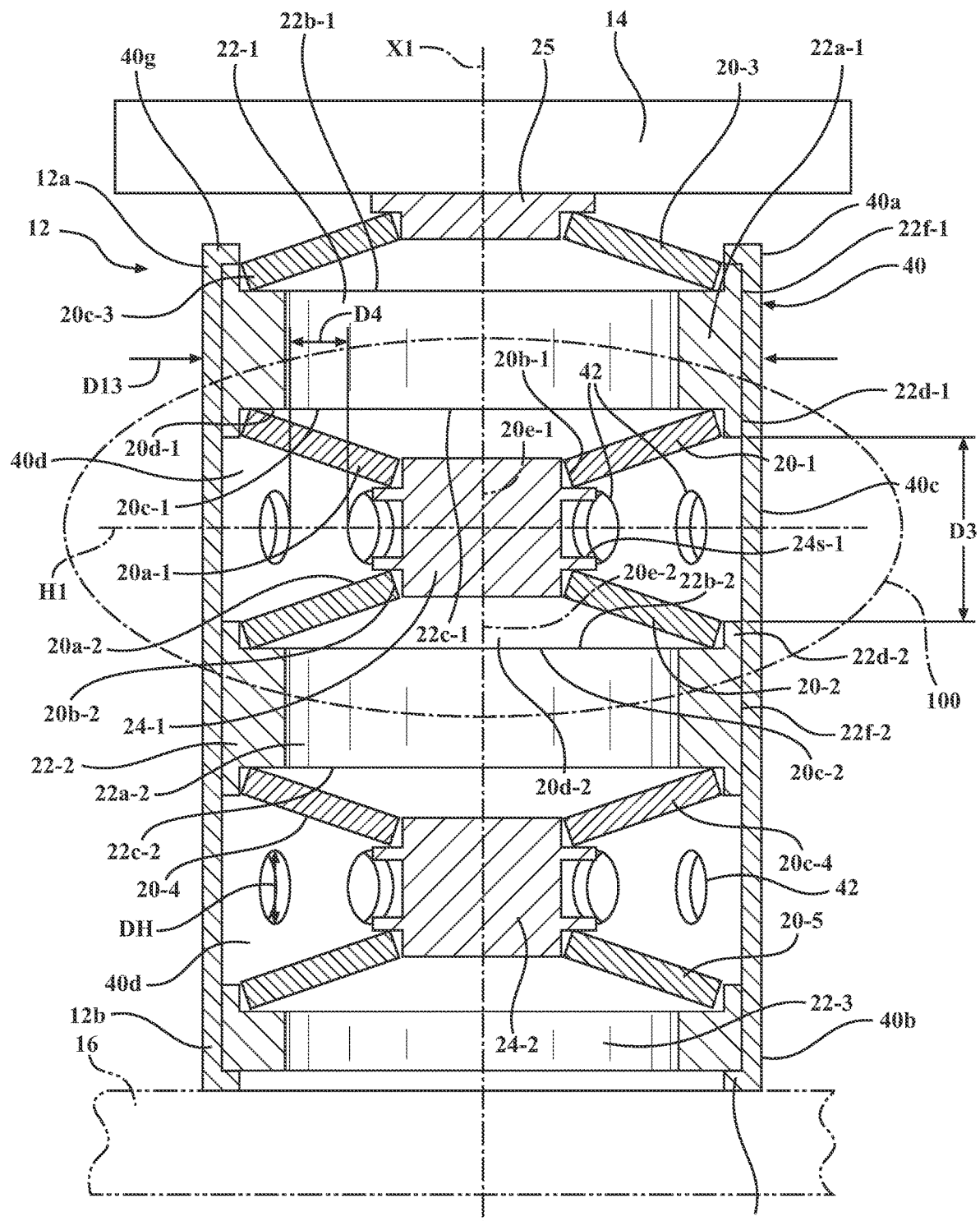
FIG. 4 is a schematic side cross-sectional view of a vibration isolator in accordance with an embodiment described herein incorporated into the seat assembly shown in FIGS. 1-3.

FIG. 4 shows a schematic side cross-sectional view of one embodiment of a vibration isolator (generally designated 12) in accordance with an embodiment described herein, and incorporated into the seat assembly embodiment shown in FIGS. 1-3. Unless otherwise described herein (for example, with regard to features of and related to a flexible housing 40 as described herein), the vibration isolator 12 may have the same basic structure and operation as an isolator described in any of commonly-owned U.S. Pat. No. 10,677,310 ("the '310 patent"), commonly-owned U.S. Pat. No. 10,371,229 ("the '229 patent"), or commonly-owned U.S. patent application Ser. No. 15/841,978, the disclosures of which are incorporated by reference herein in their entireties. Generally, the vibration isolator 12 may be interposed between elements of a system or mechanism to vibrationally isolate the elements from each other, so that transmission of vibrations experienced by the first element of the system or mechanism to the second element of the system or mechanism is attenuated or eliminated. In the embodiments described herein, multiple isolators 12 may be structured and positioned for limiting transfer of vibrations from the seat frame 122 to the seat pan 132 during movement of a vehicle along a road surface.

The vibration isolator(s) 12 shown in FIGS. 2 and 4 are shown with the only loadings on the isolators being due to the weight of the seat pan 132 and seat cushion 134 (i.e., without the load applied by a seat occupant). However, the isolators 12 may be structured so that these loads are insufficient to cause deformation of the isolators sufficient to produce a quasi-zero/negative stiffness response of the isolators to the applied weight, or to cause resilient deformation of the flexible isolator housings 40 as shown in FIGS. 5-8.

In general, details of the isolator internal elements and element relationships will be described with reference to the highlighted region 100 of FIG. 4. However, it will be understood that, in one or more arrangements, the elements and element relationships in the other portions of the isolator shown in FIG. 4 are the same as or repetitions of the elements and relationships shown in region 100.

The isolator 12 may have a first end 12a and a second end 12b opposite the first end. In one or more arrangements, the isolator 12 is generally cylindrical and has a central axis X1 extending therethrough. The vibration isolator 12 may include a plurality of conical disc spring members, generally designated 20. The conical disc spring members 20 may have the same shape and dimensions, or the conical disc spring members 20 may have different shapes and dimensions. The conical disc spring members 20 shown in FIG. 3 have the same shapes and dimensions within the limits of manufacturing tolerances. In other arrangements, more (or fewer) conical disc spring members and spacers as described herein may be provided to vary the dimensions and/or dynamic response of the isolator 12 as desired. Similarly, conical disc spring members 20 having differing individual force-deflection characteristics may be utilized in the isolator to vary the dimensions and/or dynamic response of the isolator as desired.

In embodiments described herein, each of the conical disc spring members 20 may have a structure, dynamic response, and other characteristics which are the same as those of conical disc spring members described in the aforementioned '310 or '229 patents. The general shape of the spring members is known in the pertinent art in the form of a Belleville washer or conical disc washer, for example.

Referring to FIG. 4, the vibration isolator 12 may include a first conical disc spring member 20-1 and a second conical disc spring member 20-2. The first conical disc spring member 20-1 may have a first end 20a-1 including a central opening 20b-1 of the conical disc spring member 20-1, and a second end 20c-1 opposite the first end 20a-1. The second end 20c-1 defines a circular base 20d-1 of the conical structure. A central axis 20e-1 of spring member 20-1 extends through a center of the central opening 20b-1 and also through a center of the circular base 20d-1. Also, the second conical disc spring member 20-2 may have a first end 20a-2 including a central opening 20b-2 of the conical disc spring member 20-2, and a second end 20c-2 opposite the first end 20a-2. The second end 20c-2 defines a circular base 20d-2 of the conical structure. A central axis 20e-2 of spring member 20-2 extends through a center of the central opening 20b-2 and also through a center of the circular base 20d-2. The central axis 20e-1 of spring member 20-1 may be coaxial with the central axis X1 of the isolator 12 when the isolator is in an unloaded condition. Similarly, the central axis 20e-2 of spring member 20-2 may be coaxial with the central axis X1 of the isolator 12 when the isolator is in an unloaded condition.

Figure 5:
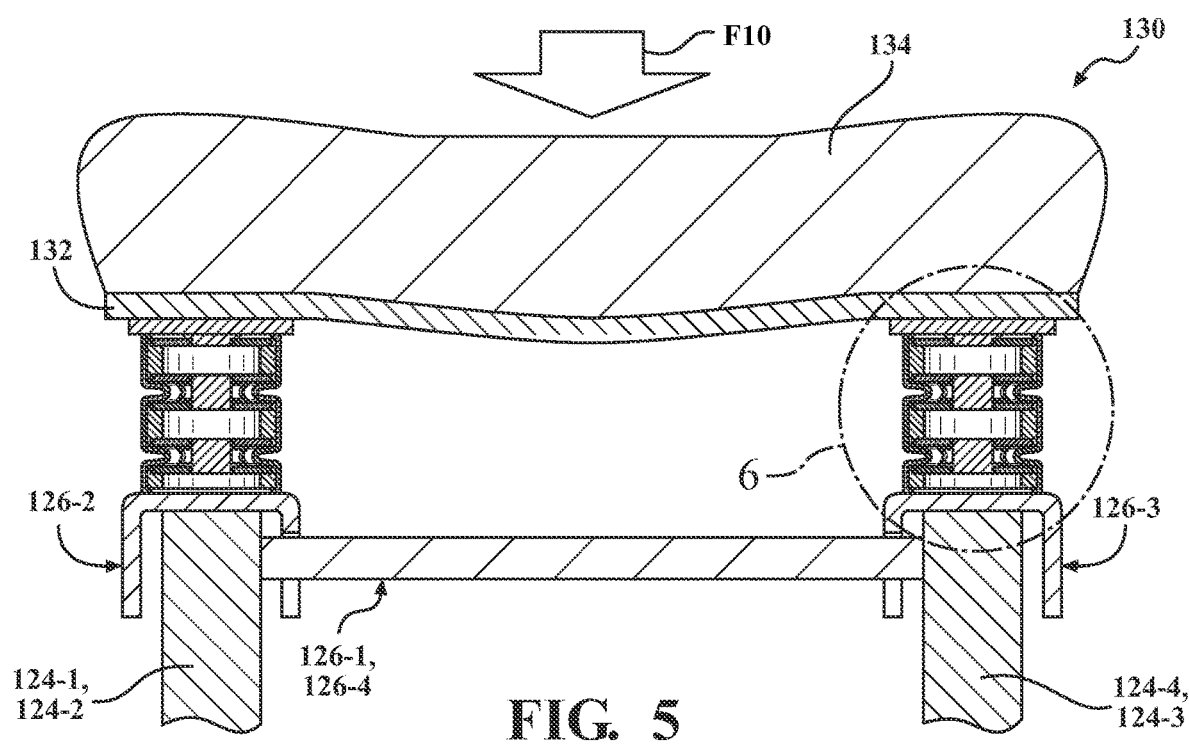
FIG. 5 is the schematic front view of FIG. 2 showing resilient deformation of the vibration isolators responsive to applied axial loadings.
Figure 6:
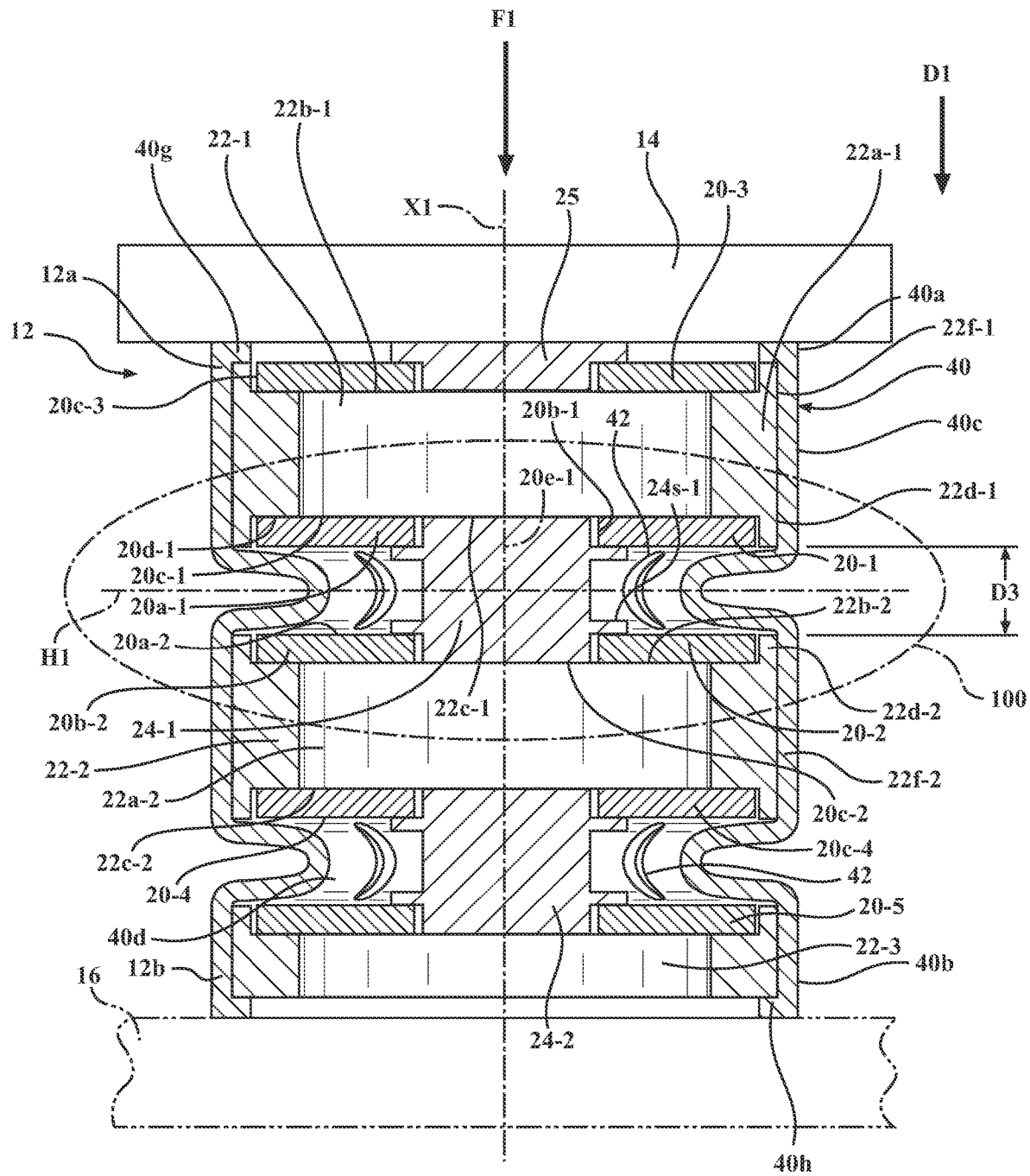
FIG. 6 is a schematic magnified view of the isolator of FIG. 4 (and one of the isolators of FIG. 5) showing resilient deformation of the isolator responsive to an applied axial load.

A suitably-structured spacer may be interposed between each two adjacent conical disc spring members 20. The spacer may be structured to engage each of the adjacent conical disc spring members so as to maintain a predetermined spacing between portions of the adjacent conical disc spring members during loading of the conical disc spring members. The spacers may also be designed to increase the deflection which may be achieved by the vibration isolator energy-absorbing structure during loading, by providing space for the conical disc spring members in contact with the spacer to flatten under loading as shown in FIGS. 5 and 6, thereby providing a degree of quasi-zero/negative stiffness response as described in the aforementioned '310 and '229 patents. A spacer may also be positioned at each end of a stack of conical disc spring members as described herein, to support portions of associated conical disc spring members.

For purposes described herein, two conical disc spring members are understood to reside adjacent each other when the spring members are positioned immediately next to each other, with no additional spring member between the two spring members. Any spacers described herein may act to space apart portions of adjacent conical disc spring members and/or to space portions of conical disc spring members apart from other parts of the isolator and/or elements exterior of the isolator. In one or more arrangements, and as described herein, loads may be applied to the isolator spring members using one or more spacers or other elements configured to interface with elements exterior of the isolator.

Referring again to FIG. 4, a second-end spacer 22-1 may have a base portion 22a-1 with a first side 22b-1 and a second side 22c-1 opposite the first side 22b-1. The first conical disc spring member second end 20c-1 may be positioned in contact with the second-end spacer base portion second side 22c-1. The first conical disc spring member second end 20c-1 may be received in a cavity formed by the base portion second side 22c-1 and a wall 22d-1 extending along an outer edge 22f-1 of the second-end spacer 22-1. A similar cavity may be formed along the first side 22b-1 of the base portion 22a-1 for receiving therein a second end 20c-3 of another conical disc spring member 20-3. "Contact" between two or more elements as described herein may include direct physical contact and indirect contact through an intermediate element(s) interposed between the two or more elements.

A first-end spacer 24-1 may be positioned in contact with the first conical disc spring member first end 20a-1 and also with the second conical disc spring member first end 20a-2. First-end spacer 24-1 may include one or more shoulders 24s-1 structured to engage the first end 20a-1 of first conical disc spring member 20-1 as shown, adjacent the central opening 20b-1 formed in the spring member first end. One or more additional shoulder(s) 24s-1 may also be structured to engage a first end of second conical disc spring member 20-2 as shown, adjacent a central opening 20b-2 formed in the second conical disc spring member first end 20a-2.

Another second-end spacer 22-2 may also be positioned in contact with the second spring member second end 20c-2. Referring again to FIG. 4, other second-end spacer 22-2 may have a base portion 22a-2 with a first side 22b-2 and a second side 22c-2 opposite the first side 22b-2. The second conical disc spring member second end 20c-2 may be positioned in contact with the second-end spacer base portion first side 22b-2. The second conical disc spring member second end 20c-2 may be received in a cavity formed by first side 22b-2 and a wall 22d-2 extending along an outer edge 22f-2 of the other second-end spacer 22-2. A similar cavity may be formed along the second side 22c-2 of the base portion 22a-2 for receiving therein a second end 20c-4 of yet another conical disc spring member 20-4. Second-end spacers 22 may be structured to provide one or more bearing surfaces (such as wall 22d-2) along their outer edges 22f that are usable for establishing and maintaining contact with portions of the isolator housing 40, as described herein.

As seen in FIG. 4, the isolator may also include conical disc spring members and spacers in addition to those just described.

The first-end spacers 24 incorporated into the isolator 12 may have the same configurations or different configurations. In the embodiment shown, first-end spacers 24-1 and 24-2 have the same configurations. Thus, the description of first-end spacer 24-1 set forth herein also applies to spacer 24-2 and any other similarly configured spacers that may be incorporated into an embodiment of the vibration isolator. Similarly, the second-end spacers 22 incorporated into the isolator may have the same configurations or different configurations. Second end spacers 22-1 and 22-2 shown in FIG. 4 have the same configurations. Thus, the description of spacer 22-1 set forth herein also applies to spacer 22-2 and any other similarly configured spacers that may be incorporated into an embodiment of the vibration isolator.

Embodiments of the vibration isolator described herein may be structured to provide a quasi-zero/negative stiffness response to a force applied to the vibration isolator when the force applied to the isolator is within an associated predetermined range. Also, each conical disc spring member may be structured to provide a quasi-zero/negative stiffness response to a force applied to the spring member when a force applied to the spring member is within an associated predetermined range. Characteristics of the conical disc spring members and other elements of the isolator 12 needed to provide quasi-zero/negative stiffness responses of the isolator and of individual conical disc spring members are described in detail in the aforementioned '310 and '229 patents.

Figure 7:
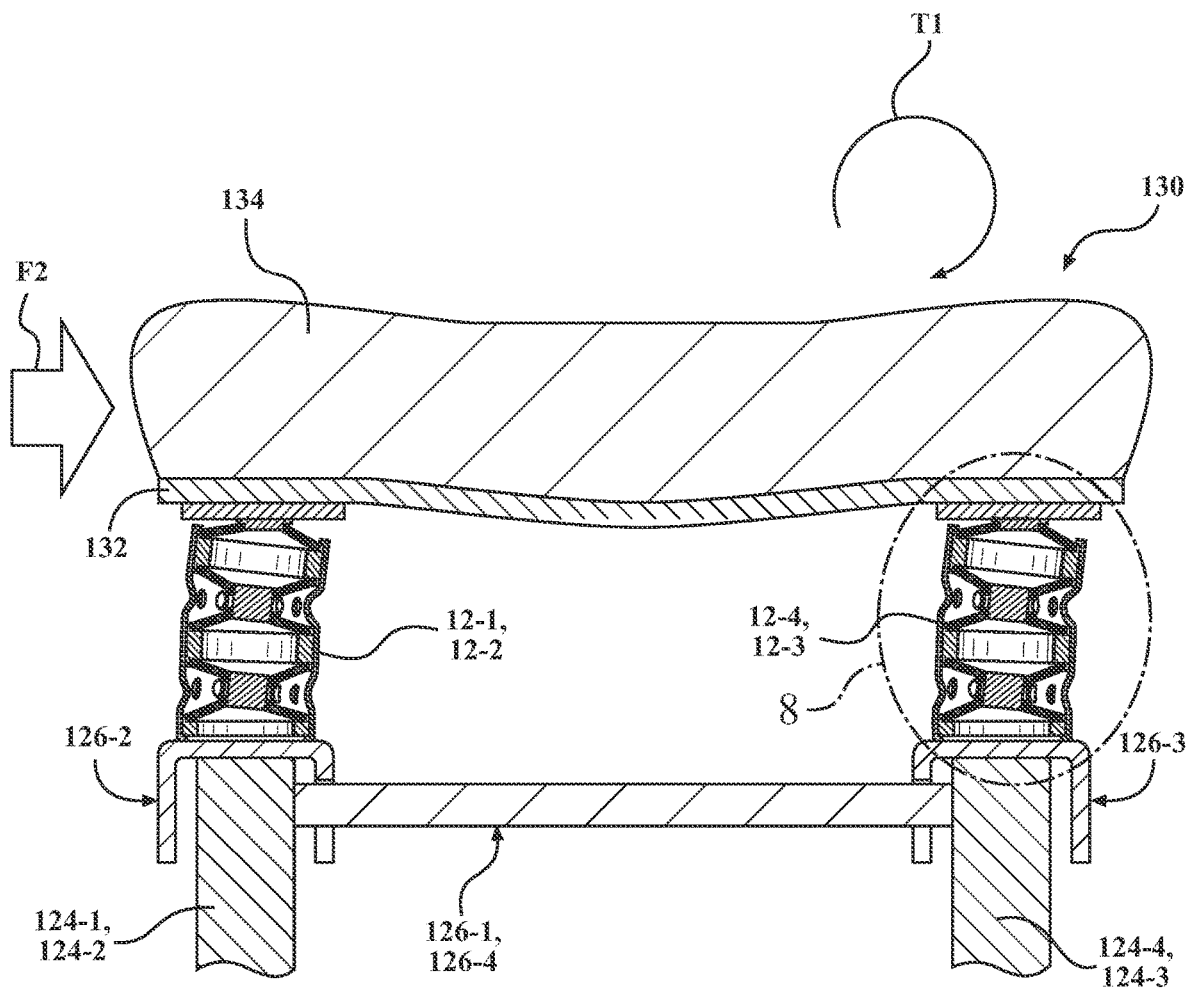
FIG. 7 is the view of FIG. 5 showing resilient lateral bending or angular deflection of the vibration isolators with respect to central axes of the isolators, responsive to application of a sideways load and/or a torsional load to portions of the isolators through the seat bottom.
Figure 8:
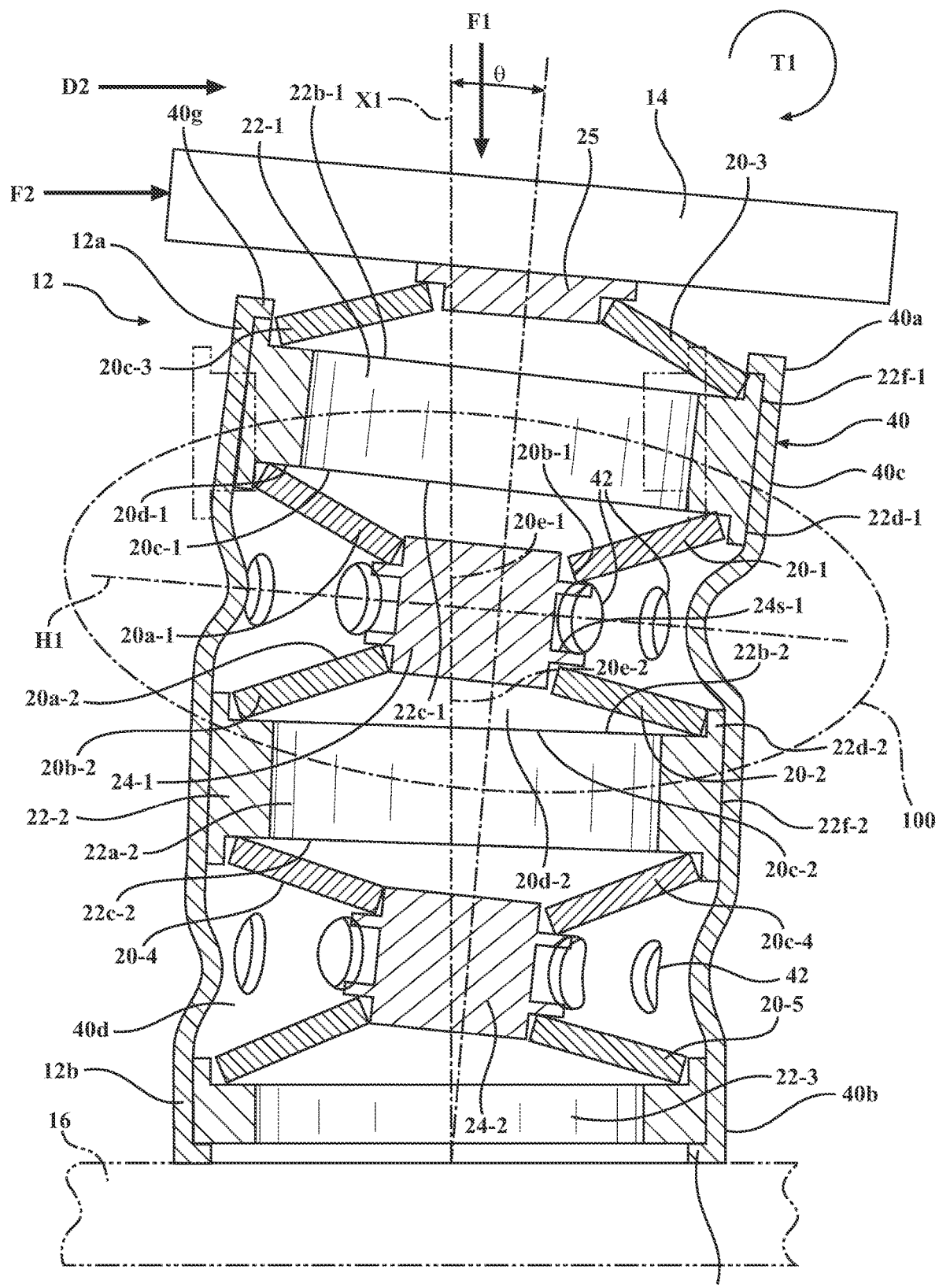
FIG. 8 is a schematic magnified view of the isolator of FIG. 4 (and one of the isolators of FIG. 7) showing resilient deformation of the isolator responsive to application of a sideways load and/or a torsional load to a portion of the isolator.

Referring to FIGS. 4-8, in one or more arrangements, each of the vibration isolators 12 may include a flexible housing 40 having a first end 40a and a second end 40b positioned opposite the first end 40a. At least one wall 40c may extend between the first and second ends 40a, 40b. The first end 40a, second end 40b, and at least one wall 40c may combine to define an interior 40d of the housing. The term "flexible" as applied to housing 40 means that the housing is capable of bending axially and as shown in FIGS. 5 and 6. The term "flexible" also means that housing 40 is also capable of bending laterally as shown in FIGS. 7 and 8 responsive to loads which tend to deflect a portion of the isolator (for example, first end 12a of the isolator) in a direction away from the central axis X1 of the isolator. Such a tendency to bend may arise, for example, from a torsional load T1 (FIGS. 7 and 8) applied to the isolator or from a lateral load F2 (FIGS. 7 and 8) applied to the isolator at or near an end of the isolator and having a component in a direction D2 extending perpendicular to axis X1. In embodiments, the housing 40 may be formed from a rubber or polymeric material suitable for the applications described herein.

Each combination of conical disc spring members 20 and spacers 22, 24 inside the housing 40 in a given embodiment of the vibration isolator forms an associated energy-absorbing structure incorporated into the housing. Housing 40 may contain and/or be in contact with the deflectable and movable components (such as conical disc spring members 20 and spacers 22, 24 described herein) forming the energy-absorbing structure of the isolator. As stated previously, the isolator 12 may be coupled to other, exterior elements (not shown) to mitigate or eliminate transmission of vibration between the other elements.

Referring again to FIG. 4, the housing 40 may be in contact with and extend between the second-end spacer 22-1 and other second-end spacer 22-2 so that at least the first-end spacer 24-1 and the first and second spring members 20-1, 20-2 are received in the housing interior 40d. In arrangements including additional spacers and conical disc spring members, the housing 40 may be structured to extend between the second-end spacers located closest to respective ends of the isolator (e.g. spacers 22-1 and 22-3 in FIG. 4). Thus, in the embodiment shown in FIG. 4, the housing 40 extends between second-end spacers 22-1 and 22-3, thereby containing the first-end spacers 24-1, 24-2 and all of conical disc spring members 20-1, 20-2, 20-4 and 20-5 within the housing interior 40d.

In one or more arrangements, to enhance the flexibility of the isolator housing 40, the housing 40 may include a plurality of spaced-apart through holes 42 formed therealong between the second-end spacer 22-1 and other second-end spacer 22-2. In embodiments such as shown in FIG. 4 with multiple first-end spacers 24 and additional second-end spacers 22 and conical disc spring members 20, through holes 42 may be formed in the housing 40 between each pair of adjacent second-end spacers 22. It has been found that the holes 42 increase the ability of the housing 40 to deflect and bend as shown in FIGS. 7-8.

In particular arrangements, the through holes 42 formed in the housing may be circular. In particular arrangements, the through holes 42 may be formed in the housing so as to be coaxial along an axis H1 extending along the housing wall 40c and along a plane structured to be perpendicular to the isolator axis X1 when the isolator 12 is unloaded.

In particular arrangements, each of the through holes 42 has a diameter DH in the range of 0.3×D3–0.8×D3, where D3=a minimum spacing between the second end spacer 22-1 and the other second-end spacer 22-2 when the vibration isolator 12 is in an undeflected condition as shown in FIG. 4. In more particular arrangements, each of the through holes has a diameter DH in the range of 0.3×D3–0.4×D3.

In particular arrangements, all of the through holes 42 may have equal diameters (within applicable tolerance limits). In more particular arrangements, a minimum spacing D4 between adjacent through holes of each pair of adjacent through holes is equal to the diameter of the through holes 42. The spacing D4 may be a spacing between closest edges of the adjacent holes 42 taken along an exterior surface of the housing 40.

In particular arrangements, the housing 40 may be formed from a length of suitably dimensioned heat-shrinkable tubing processed so as to form an interference fit with the second-end spacer 22-1 and the other second end spacer 22-2 along outer edge portions of the second-end spacers 22-1, 22-2. The interference fits between the tubing and the second-end spacers may aid in keeping the conical disc spring members and spacers in contact with each other, thereby maintaining the structural integrity of the assembled spring/spacer structure. In one or more arrangements, the tubing may include a heat-softenable adhesive material positioned along interior surfaces of the tubing, to aid in securing the tubing to outer edges of the second-end spacers after the tubing is applied to the spring/spacer assembly.

In particular arrangements, the holes 42 may be formed in the tubing prior to application of the tubing to the assembled spring/spacer structure to form the housing. The spacings to be provided between the holes 42 may be determined according to the particular dimensions of the assembled spring/spacer structure. In other arrangements, the holes may be formed in the housing material after application of the housing material to the assembled spring/spacer structure.

It has been found that the degree of shrinkage of the tubing may be controlled by suitable application of heat to ensure contact between the tubing and the second-end spacers and to exert a degree of control over the stiffness of the housing. Specifically, the stiffness of the housing may be increased if desired by increasing the amount of shrinkage of the tubing around the assembled spring/spacer structure.

In particular arrangements, the housing 40 may include at least one lip overlapping a corner of an associated one of the second-end spacers. In the embodiment shown in the drawings, lips 40g, 40h are formed at respective ends of the housing 40. In an embodiment of the housing formed from heat-shrinkable tubing, the lips 40g, 40h may be formed by providing a length of tubing slightly longer than the unloaded assembled spring/spacer structure. When heat is applied to contract the lip portions of the housing, the lips 40g, 40h may overlap the corners of the second-end spacers at each end of the assembled spring/spacer structure. The assembled spring/spacer structure may be slightly axially compressed between the lips 40g, 40h to help keep the structure together during loading, when unloaded, and also during transport prior of the isolator. In embodiments without one or more lips, tubing shrinkage dimensions may be controlled to provide interference fits with the second end spacers 22 sufficient to maintain contact between the tubing and the second-end spacers.

The structures of the conical disc spring members 20 and the spacers 22, 24 at the contact interfaces between the spring members and spacers may be configured to facilitate transfer of forces between the conical disc spring members and the spacers and to help maintain contact between the isolator elements as shown in the drawings, responsive to forces exerted on the conical disc spring members 20 and the spacers by the housing 40 as described herein.

Flexibility of the housing 40 may be controlled by suitable modification of the number, dimensions and/or arrangements of holes 42, the thickness and composition of the housing material, and the degree of shrinkage (in a heat-shrinkable tube application). Referring to FIGS. 5-8, a force application member(s) 14 (such as a portion of a vehicle seat assembly or an intermediate part separate from the seat assembly) may enable forces to be transferred from an exterior of the isolator 12 to the energy-absorbing structure located in the housing interior 40d. As shown in FIGS. 5-8 a force application member 14 may contact a spacer 25 inside the housing to deflect the isolator 12. The spacer 25 may be structured to engage a portion of an associated conical disc spring member 20-3 adjacent a central opening in a first end of the conical disc spring member 20-3, to enable application of a force to a first end of the conical disc spring member.

As previously described, flexible housing 40 is also structured to enable the housing to bend as shown in FIGS. 7 and 8 responsive to loads which tend to deflect a portion of the isolator (for example, first end 12a of the isolator) in a direction away from the central axis X1 of the isolator. Such a tendency to bend may arise, for example, from a torsional load T1 applied to the isolator and/or from a lateral load F2 applied to the isolator at or near an end of the isolator in a direction D2 perpendicular to axis X1. In many applications, a lateral load F2 and/or a torsional load T1 may be applied to the isolator in addition to the axial load component F1 of the load F10 on the seat bottom 130 applied in direction D1 toward the floor of the occupant compartment as shown in FIGS. 5 and 6.

FIGS. 5 and 6 show resilient deformation of the isolators 12 responsive to application of a load F1 along the axis X1 of the isolator. As seen in the drawings, the flexible housing 40 may be structured to deform such that portions of the housing extending between adjacent ones of the second-end spacers 22 deflect inwardly toward the housing interior and into spaces between the adjacent second-end spacers. Withdrawal of the axial load F1 may enable the isolator to return to the unloaded shape shown in FIGS. 2 and 4.

In one or more arrangements, an isolator 12 structured as shown in the drawings and including an embodiment of a perforated housing 40 as described herein may have an end (for example, first end 12a) which is rotatable up to an angle of θ relative to the unloaded isolator axis X1, as shown in FIGS. 7 and 8. In one or more arrangements, the isolator may be structured to bend to a maximum bend angle θ of 10° degrees with respect to the isolator central axis.

The flexible structure of the housing 40 enables the isolator 12 to resiliently bend to comply to some degree with torsional and lateral loading and the resulting displacements of portions of the isolator, while maintaining the lateral stability and structural integrity of the isolator. Bearing forces exerted by the housing 40 on the second-end spacers 22 aid in preventing the various spacers and conical disc spring members from separating or losing contact with each other in the housing interior while the isolator 12 is both unloaded and loaded.

Referring to FIGS. 3 and 4, in one or more arrangements, each vibration isolator 12 may have an outer diameter D13 taken along an outermost surface of the housing 40 when the housing is unloaded. In one or more arrangements, the housings 40 of all isolators 12 in the seat assembly 120 may have the same diameters. In addition, referring to FIG. 3, a maximum spacing D8 of each vibration isolator 12 from a vertical plane defined by each edge of a pair of associated intersecting edges of the seat pan (for example, left side edge 132b and front edge 132c as shown in FIG. 2) may be equal to the isolator outer diameter D13.

Referring again to FIG. 1, in one or more arrangements, each vibration isolator 12 may be positioned so as to reside directly above an associated one of seat rails 124 when the seat assembly 120 is installed in the vehicle.

Referring to FIGS. 5 and 6, in operation and as previously described, the isolator flexible housings 40 may resiliently deform responsive to respective an axial load component F1 applied through the seat pan 132. In addition to deforming axially, the flexible housings 40 may also resiliently bend as shown in FIGS. 7 and 8 responsive to loads which tend to deflect a portion of the isolator (for example, first ends 12a of the isolators) in a direction away from the central axes X1 of the respective isolators. Such a tendency to bend may arise, for example, from a torsional load T1 applied to the isolator and/or from a lateral load F2 applied to the isolator at or near an end of the isolator in a direction D2 perpendicular to axis X1. In many applications, a lateral load F2 and/or a torsional load T1 may be applied to the isolator in addition to the axial load component F1 shown in FIGS. 5 and 6.

As stated previously, FIGS. 5 and 6 show resilient deformation of the isolator 12 responsive to application of a load F1 along the axis X1 of the isolator. As seen in the drawings, the flexible housing 40 may be structured to deform such that portions of the housing extending between adjacent ones of the second-end spacers 22 deflect inwardly toward the housing interior and into spaces between the adjacent second-end spacers. Withdrawal of the axial load F1 may enable the isolator to return to the unloaded shape shown in FIGS. 2 and 4.

As stated previously and as shown in FIG. 8, in one or more arrangements, an isolator 12 structured as shown in the drawings and including an embodiment of a perforated housing 40 as described herein may have an end which is rotatable up to an angle of θ relative to the unloaded isolator central axis X1. In one or more arrangements, the isolator may be structured to bend to a maximum bend angle θ of 10° with respect to the isolator central axis X1.

The flexible structure of the housing 40 enables the isolator 12 to resiliently bend to comply to some degree with torsional and lateral loading and the resulting displacements of portions of the isolator, while maintaining the lateral stability and structural integrity of the isolator. Bearing forces exerted by the housing 40 on the second-end spacers aid in preventing the various spacers and conical disc spring members from separating or losing contact with each other in the housing interior while the isolator 12 is both unloaded and loaded.

Positioning the isolators 12 between the seat frame 122 and the seat pan 132 aids in minimizing the loads experienced by the isolators 12. This enables the isolators to be more lightly constructed than, for example, isolators designed to be positioned between the seat base and the floor of the occupant compartment because the isolators do not need to support the weight of the seat frame 122 in addition to occupant loading. This also enables the isolators to be designed to provide quasi-zero/negative responses over a greater range of loading applied to the isolators.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle seat assembly comprising:
a seat frame;
a seat pan; and
a plurality of vibration isolators interposed between the seat frame and the seat pan for limiting transmission of vibrations from the seat frame to the seat pan, each vibration isolator including:
a flexible housing including at least one wall defining an interior of the housing; and
an arrangement of conical disc spring members positioned in the interior and structured so that the vibration isolator provides a quasi-zero/negative stiffness response when a force applied to the isolator is within a predetermined range.

2. The vehicle seat assembly of claim 1 wherein each vibration isolator of the plurality of vibration isolators is structured to provide a quasi-zero/negative stiffness response to a force applied to the vibration isolator when the applied force is within a predetermined range.

3. The vehicle seat assembly of claim 1 wherein each vibration isolator of the plurality of vibration isolators has an outer diameter and wherein a maximum spacing of each vibration isolator from vertical plane defined by each edge of a pair of associated intersecting edges of the seat pan is equal to the isolator outer diameter.

4. The vehicle seat assembly of claim 1 wherein each vibration isolator of the plurality of vibration isolators is positioned so as to reside directly above an associated seat rail of the seat frame when the seat assembly is installed in a vehicle.

5. The vehicle seat assembly of claim 1, wherein the at least one wall is structured so as to be inwardly deflectable toward a central axis of the housing responsive to application of an axial load to the housing.

6. The vehicle seat assembly of claim 1 wherein each conical disc spring member is structured to provide a quasi-zero/negative stiffness response to a force applied to the spring member when the applied force is within a predetermined range.

7. The vehicle seat assembly of claim 1, wherein the housing includes a plurality of spaced-apart through holes formed in the at least one wall.

8. The vehicle seat assembly of claim 7 wherein the through holes of the plurality of through holes are circular.

9. The vehicle seat assembly of claim 7, wherein at least a portion of the through holes of the plurality of through holes are formed in the housing so as to be coaxial along an axis extending along the housing wall and along a plane structured to be perpendicular to a central axis of the isolator when the isolator is unloaded.

10. The vehicle seat assembly of claim 1 wherein each vibration isolator of the plurality of vibration isolators includes:
a first conical disc spring member having a first end and a second end opposite the first end;
a first-end spacer in contact with the first spring member first end;
a second-end spacer in contact with the first spring member second end;
a second conical disc spring member having a first end and a second end opposite the first end, the second spring member first end being in contact with the first-end spacer; and
another second-end spacer in contact with the second spring member second end, wherein the housing of each isolator is in contact with and extending between the second-end spacer and the other second-end spacer so that the first-end spacer and the first and second spring members are received in the housing interior.

11. The vehicle seat assembly of claim 10, further comprising a plurality of spaced-apart through holes formed in the at least one wall, and wherein the through holes of the plurality of spaced-apart through holes are formed along the at least one wall between the second-end spacer and the other second-end spacer.

12. The vehicle seat assembly of claim 10, wherein the housing includes a plurality of spaced-apart through holes formed in the at least one wall, each of the through holes having a diameter DH in a range of 0.3×D3–0.8×D3, where D3=a minimum spacing between the second end spacer and the other second-end spacer when the vibration isolator is in an undeflected condition.

13. The vehicle seat assembly of claim 12, wherein each of the through holes has a diameter DH in the range of 0.3×D3–0.4×D3.

* * * * *